(12) United States Patent
McCoskey et al.

(10) Patent No.: US 8,123,163 B2
(45) Date of Patent: Feb. 28, 2012

(54) AIRCRAFT KINETIC LANDING ENERGY CONVERSION SYSTEM

(75) Inventors: William R. McCoskey, Mill Creek, WA (US); Michael M. Vander Wel, Lynnwood, WA (US); Richard N. Johnson, Anacortes, WA (US)

(73) Assignee: The Boeing Company, Chicago, IL (US)

( * ) Notice: Subject to any disclaimer, the term of this patent is extended or adjusted under 35 U.S.C. 154(b) by 712 days.

(21) Appl. No.: 12/106,135

(22) Filed: Apr. 18, 2008

(65) Prior Publication Data

US 2008/0258014 A1 Oct. 23, 2008

Related U.S. Application Data

(60) Provisional application No. 60/872,443, filed on Apr. 20, 2007.

(51) Int. Cl.
*B64C 25/42* (2006.01)
(52) U.S. Cl. .................................. 244/110 A; 244/111
(58) Field of Classification Search .............. 244/103 R, 244/103 S, 110 R, 111, 110 A
See application file for complete search history.

(56) References Cited

U.S. PATENT DOCUMENTS

| | | | |
|---|---|---|---|
| 3,160,371 A * | 12/1964 | Doolittle ................... | 244/110 A |
| 3,482,806 A * | 12/1969 | Trautzsch et al. ......... | 244/103 R |
| 4,476,947 A | 10/1984 | Rynbrandt | |
| 5,104,063 A * | 4/1992 | Hartley ...................... | 244/103 S |
| 5,207,304 A | 5/1993 | Lechner et al. | |
| 5,517,093 A | 5/1996 | Augustyniak et al. | |
| 6,503,318 B2 | 1/2003 | Pye et al. | |
| 6,758,440 B1 * | 7/2004 | Repp et al. ................ | 244/110 R |
| 6,971,819 B2 | 12/2005 | Zaleski et al. | |
| 7,226,018 B2 * | 6/2007 | Sullivan ..................... | 244/111 |
| 7,237,748 B2 * | 7/2007 | Sullivan ..................... | 244/111 |
| 7,445,178 B2 * | 11/2008 | McCoskey et al. ......... | 244/50 |
| 7,469,858 B2 * | 12/2008 | Edelson .................... | 244/103 S |
| 7,594,626 B2 * | 9/2009 | Soderberg ................. | 244/103 S |
| 7,703,717 B2 * | 4/2010 | Soderberg ................. | 244/103 S |
| 2003/0102407 A1 * | 6/2003 | Wood et al. .............. | 244/114 R |

(Continued)

OTHER PUBLICATIONS

Koseki, Takafumi et al, Innovative Power Supply System for Regenerative Trains, University of Tokyo, 2004.

*Primary Examiner* — Benjamin P Lee
(74) *Attorney, Agent, or Firm* — Felix L. Fischer

(57) ABSTRACT

A kinetic energy system which transfers the kinetic landing into recoverable electric energy for an aircraft. The system incorporates at least one wheel supporting the aircraft for landing and takeoff coupled with a dynamic functioning motor/generator mounted to and operated by rotation of the wheel to create electrical energy from kinetic energy. An induction shoe structurally connected to the aircraft and electrically connected to the motor/generator, which shoe draws the converted energy from the generator which supplies the load created by the inductively coupled induction shoe to the an ancillary load provided by the resistive heat sink on by the capacitor storage bank. This provides the generator circuit for conversion of the rotational energy of the wheel to electrical energy and creates braking drag. In exemplary embodiments, the system employs an energy storage system acting as the load to store electrical potential energy created by the generator. Additionally, the generator is employable as a motor, receiving energy from the storage system for traction power to the associated aircraft wheel. An induction grid or a surface mounted conductive layer mounted into or onto a runway is employed for transferring energy to and from the motor/generator.

22 Claims, 6 Drawing Sheets

U.S. PATENT DOCUMENTS

| | | | |
|---|---|---|---|
| 2004/0212259 A1* | 10/2004 | Gould | 310/67 R |
| 2005/0224642 A1* | 10/2005 | Sullivan | 244/111 |
| 2006/0038068 A1* | 2/2006 | Sullivan | 244/111 |
| 2007/0158497 A1* | 7/2007 | Edelson et al. | 244/103 S |
| 2007/0284478 A1* | 12/2007 | Soderberg | 244/103 R |
| 2010/0006699 A1* | 1/2010 | Sullivan | 244/111 |

* cited by examiner

AIRCRAFT KINETIC LANDING ENERGY CONVERSION SYSTEM

REFERENCE TO RELATED APPLICATIONS

This application claims priority of U.S. provisional application Ser. No. 60/872,443 which is a provisional conversion of U.S. application Ser. No. 11/738,407 filed on Apr. 20, 2005 having the same title as the present application and a common assignee the disclosure of which is incorporated herein.

BACKGROUND OF THE INVENTION

1. Field of the Invention

This invention relates generally to the field of aircraft braking systems and more specifically to a method and system for recovery, storage, and use of kinetic braking energy using wheel-mounted motor/generators to transform kinetic stopping energy into electric energy for transfer through an inductive coupling to an energy recovery and storage system.

2. Description of the Related Art

The main requirement of aircraft braking systems is to be capable of stopping the aircraft at its end of flight destination and is typically used on the order of only a few seconds within the context of many hours of flight time. The weight of current commercial aircraft is increased by several thousands of pounds of braking and supporting systems that penalize the actual operational intent, profile and efficiency of the aircraft during its flight mission.

The prime mission of an aircraft is sustained flight of an aircraft, and large amounts of excess fuel and engine thrust energy is required to transport these excess systems weights. Therefore, current braking systems require carrying extra fuel for end of flight and taxi to gate requirements, incurring even more weight and operational cost. Current airplane braking and supporting systems also represent significant recurring cost impact to aircraft operators in terms of the brake wear and maintenance costs associated with the current friction brakes, thrust reversers and spoilers.

Thrust reversers and spoilers are not required to decelerate and stop an aircraft, but rather to offset the high costs associated with friction brake wear. Friction brakes, spoilers and thrust reversers require a complex hydraulic system to be designed and produced. These components and the complex hydraulic system add additional procurement cost, component weight, and fuel weight to the aircraft, resulting in higher maintenance costs and higher recurring operational expenses to the operators.

Furthermore, the current friction brakes must be allowed to cool down prior to departure to ensure full braking capability. Cool down time can thus slow the turn around rates of aircraft, which lessens airport throughput efficiency and effectiveness while also lowering airline revenues.

Current friction brake systems must also be capable of absorbing and dissipating the entirety of the kinetic energy from stopping a fully loaded aircraft upon an aborted takeoff as heat. This requirement demands that the current brake systems have enough mass to absorb stopping energy and forces the design of a system that is much heavier than actual operational service requirements needs. This is extremely inefficient and requires excess material mass that is parasitic weight to an aircraft's flight mission, further penalizing the aircraft in fuel efficiency, procurement costs and maintenance expenses.

Brake systems are required to be designed to supply 100% of the braking capability required of a fully loaded aircraft at end of their wear life without aid from thrust reversers or spoilers. As a result, current brake system design is overdesigned as measured against the actual service requirement to meet the safety needs of the aircraft.

Spoilers provide an additional benefit to for optimizing the functional requirements of slowing down and stopping an aircraft that must be retained. That additional benefit is to spoil the lift generated by the wings, and thereby transfer the weight needed for tire to runway braking friction down onto the wheels.

Currently thrust reversers are also used for brake augmentation and this system also adds significant weight, cost and complexity to an aircraft. The need for a thrust reverser is primarily driven by the need to reduce the high maintenance costs driven by friction brake wear. In addition, thrust reversers are viewed as a secondary braking system that is (slippery) runaway independent.

It is therefore desirable to significantly decrease the initial procurement weight and cost of aircraft as compared to the current systems in use within the fleet today by simplifying, downsizing, and eliminating various components of complex current braking systems.

Additionally, excess mission costs are driven by a requirement for engine thrust to be sized to a large degree by the aircraft's takeoff thrust requirements. As was demonstrated on early (1950s) military bombers, which had engines underrated to the full scope of the mission demand as were inclusive takeoff at fully loaded weight, it was proven possible to adequately perform the flight portion of the mission with engines which are significantly underrated to the thrust needs for takeoff by using thrust augmentation. Thrust augmentation was accomplished by several means, one of which was the use of augmented thrust supplied by small rocket motors which rocket motors were jettisoned after takeoff. Once at cruise the smaller engines were actually well sized for the actual flight profile of the mission and could actually perform more efficiently than would have the larger engines which would have consumed more fuel at cruise so the smaller engines were able to increase the operational range of those bombers.

In current airport infrastructures runway and taxiway maintenance represent not only high costs to the various airport authorities, but also represents high costs being transferred to the carriers in the form of higher landing fees and gate fees, which costs are then transferred on to the general flying public in the form of higher ticket costs. The primary driver of these costs is the costs of maintaining the surface of the runways and taxiways which result from patching cracks, potholes and surface spalling. In the northern latitudes the primary contributing factor to runway and taxiway surface deterioration is from the freezing and thawing of the moisture absorbed into the paving materials. Heating of taxiway surfaces has been proven effective at Chicago O'Hare airport where there is a test strip of conductive asphalt in place. The test strip is an electrically conductive asphalt made by Chicago-based Superior Graphite. The method as tested in Chicago works, but the high cost of energy has not as yet passed a business case.

It is therefore desirable to convert the kinetic energy of stopping aircraft to electrical energy, and store and utilize the energy. In one use, the energy recovered can be used to create heat for maintaining the surface above freezing and thereby provide deicing and protection of surface from freeze/thaw cycles. This mitigates energy cost by having the energy supplied by recovering the kinetic landing energy of the aircraft themselves and thereby supplies the required energy from a source which is now waste energy.

SUMMARY OF THE INVENTION

The present invention provides a kinetic landing energy conversion, transfer, storage and redistribution system for an aircraft incorporating at least one wheel supporting the aircraft for landing and takeoff coupled with a motor/generator capable of operating in the dynamic regeneration mode. The motor/generator is mounted to and operated by rotation of a wheel to create electrical energy from the motor's operating dynamic regeneration mode. The energy generated is transferred to an induction discharge and energy pick up shoe which is structurally connected to the wheel trucks or strut of the aircraft and is electrically connected to the generator. The induction shoe draws the electrical energy from that motor/generator creating a motion resisting load from the motor/generator The induction discharge between the discharge shoe and the receiving conductive elements creates additional braking energy by creating magnetic flux vortices between the discharge shoe coils and runways conduction system. These flux vortices which are formed by the forward motion of the discharge shoe over the runways conductive pick up elements result in a drag force that augments the braking force of the dynamic motor/brake, and also places a load on the generator for conversion of the rotational energy of the wheel to the electrical energy being creating braking regeneration field drag inside the motor/generator.

In exemplary embodiments, the system employs an energy storage system acting as the load to store discharged electrical energy created by the motor/generator braking system.

Additionally, the generator is employable as a motor, receiving recovered braking energy back from the storage system for traction power to the associated aircraft wheel motor/generators. This traction power is then used for taxiing the aircraft and also for takeoff thrust augmentation. The induction grid or conductive surface mounted on or into a runway is employed for transferring energy to and from the motor/generator.

The energy recovery, storage, storage and redistribution system also allows utilization of electric power for other ground operations vehicles and needs.

Alterative embodiments additionally employ a system which uses abbreviated conventional friction brakes to augment the dynamic regeneration braking system This system also employs an actuation systems which automatically activates the brakes at aircraft touch down on landing. The system is activated by either a ground proximity probe or by a sensor which is activated within the strut hydraulic suspension system which activates the dynamic motor/brake when a predetermined load is applied down onto the wheels. This is accomplished by the compression of the suspension system engaging a brake activation system which may be either, electrical, mechanical or electro-mechanical.

There is a thermal separation boundary between the convention brake system and the motor/generator dynamic braking system. This thermal boundary thermally protects the motor/generator from the heat produced by the conventional brakes if they are required to be employed on a rejected take off situation.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Figure 1:
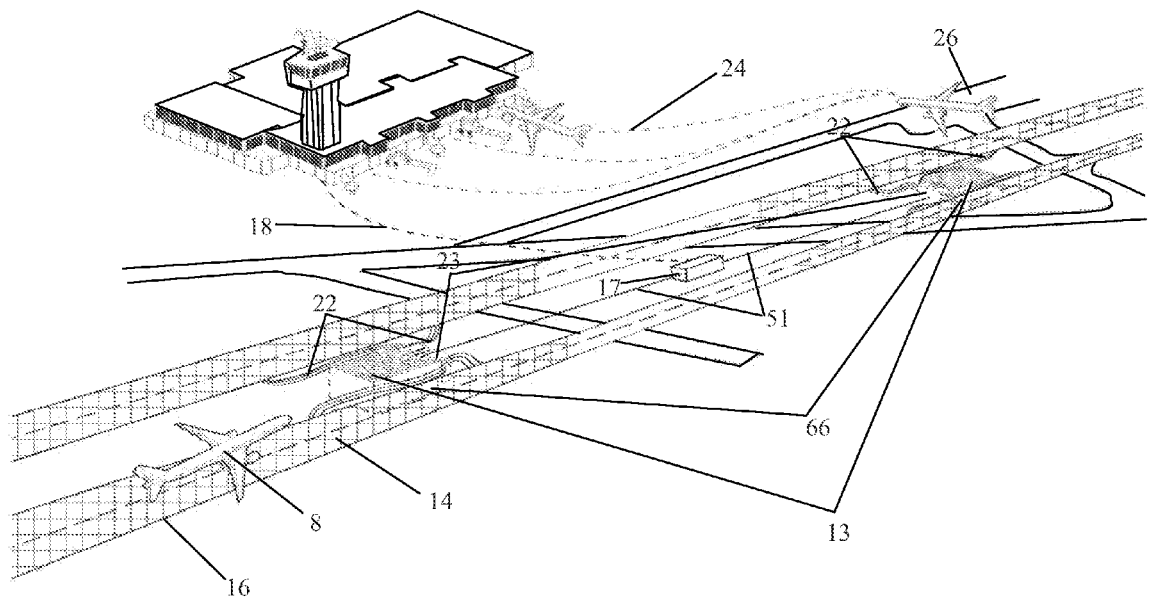
FIG. 1 is a block diagram of the operating system elements for an overall system employing the invention
Figure 2:
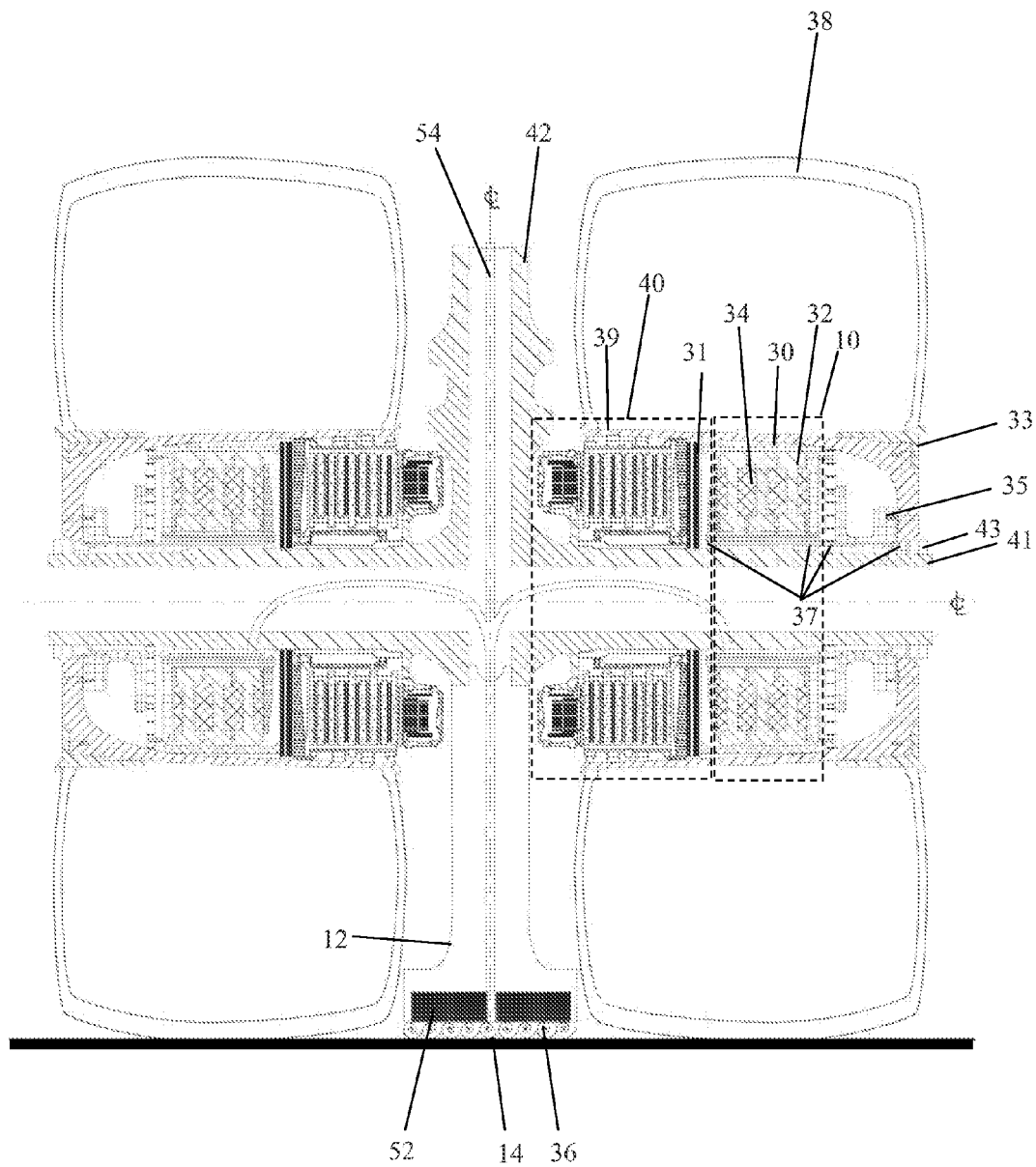
FIG. 2 is a cross section elevation view of an exemplary landing gear truck employing a braking system according to the present invention.

A system provided by embodiments of the present invention as shown in pictorial form in FIG. 1 with details of the wheel mounted system elements in FIG. 2, makes the aircraft braking system capable of dissipating the majority of the kinetic landing energy from an aircraft in the form of electricity. This discharge of energy is accomplished by the combination of dynamic motor/generator braking, reverse polarity motor/generator energizing in a wheel mounted motor/generator system 10 (seen in FIG. 2) and the off-loaded electrical energy recovered and reformed from the kinetic energy of landing deceleration of an aircraft 8 by means of induction through a transfer shoe 12 discharging into a pick up grid or conductive runway surface material 14 imbedded into or placed onto the runway 16. The pick up grid or conductive surface material in turn transmits the converted landing deceleration energy to one or more dispersal or recovery and storage facilities 20 at a location remote from the aircraft. The dispersal and recovery facility (also shown and described in greater detail subsequently with respect to FIG. 6), the ground based grid or conductive runway surface element 14 located in or on the runway and taxiways provides power through energy pickup and distribution lines 22 capacitors 13 located in dry wells 66 or other appropriate facilities at the airport. An inverter/converter/power conditioner and energy management unit 17 is available to draw excess power from the storage capacitors for distribution through buried transmission lines 18 to the primary electrical utility grid or supply for other use. Alternatively, a resistive array 15 is available to disperse excess energy as heat to the atmosphere. A power controller/conditioner 23 provides the power from the received to the aircraft's onboard storage and distribution system 11 or to the off board storage capacitors 23 as previously described back to the conductive runway and taxiway grids to supply motor demands of aircraft on the taxiway and during takeoff as will be described in greater detail subsequently.

Excess power when available can be used for other needs as reconditioned power distributed from ground system for lighting, heat, runway/taxiway deicing, ground operations vehicles and other non-aircraft ground functions whenever total recovered landing energy exceeds taxi and takeoff energy demands and storage capacity is being exceeded.

An excess energy condition occurs when landings are exceeding takeoff and taxi demands. At such times of excess energy being created by landings, then power is reconditioned and fed into the public utility grid or is reconditioned and used to augment other airport energy demands. Conversely; when the taxi and takeoff demands exceed the stored energy from landings then system which is either a self powered auxiliary generation station or the public utility grid drawn through power conditioner and management unit 17 provides back-up power for use in the taxi/takeoff system requirements.

Currently deicing represents a high maintenance cost at many airports located in northern latitudes. These costs are further increased by the high maintenance costs of runway and taxiway surface condition maintenance being driven by constant repairs needed to cracks, spalling and potholes as are caused by the freezing and thawing of the moisture absorbed into the paving material. These conditions are mitigated by employing embodiments of the present invention. The embodiments disclosed herein keep the pavement above freezing by using the electrical resistance inherent within the conductive grid elements imbedded within the paving surface or the resistance within the conductive surface paving materials themselves which as are either imbedded into or applied over the surface of the runways and taxiways. All electrically conductive elements or surface coatings have a degree of electrical resistance, which creates heat. That heat created by resistance from offloading the kinetic landing energy from aircraft is imparted to the runways and taxiway surfaces. Similarly, the resistance in the conductive elements creates heat when the recovered electrical energy is conducted back to an aircraft or other ground operations vehicle when used for ground mobility with electric traction motors as will be described in greater detail subsequently. Electrical resistance during the initial energy recovery, taxiing and ground operations vehicle demands warms the runway and taxiway surfaces and keeps those surfaces deiced and above freezing temperature. This ancillary warming benefit of the system's primary purpose of energy recovery and redistribution reduces the cost of runway deicing, creates a safer surface condition and lengthens the life of paved surfaces, while also lowering the maintenance costs of runways and taxiways.

Recovering, storing, reconditioning and redistribution of kinetic landing energy by the embodiments disclosed in this application is predicated upon having the ability to discharge and recover kinetic landing energy as electrical energy by discharge through the surface upon which an aircraft is landing. Discharging through the landing surface requires that surface to either be imbedded with conductive elements or for that surface to be in itself conductive. Exemplary conductive elements employable in embodiments of the present invention are disclosed in Conductive Concrete Composition, U.S. Pat. No. 6,503,318; inventors Glendon B. Pye, Robert E. Myers, Mark E. Arnott, and James Beaudoin of the Building Envelope and Structure, Institute for Research in Construction, National Research Council Canada. As is also taught by research performed by Kelly Baldwin as note in paper titled Electrically Conductive Concrete: Properties and Potential dated May 2, 2006, Report # NRCC-42047 and also by report titled Airport 99: As Traffic Increases, So Do Maintenance Requirements, dated Feb. 1, 1999 by Tom Black, and by Electric Car and Roadway System U.S. Pat. No. 4,476,947 by; Jay D. Rynbrandt And by: Electrically Conductive Pavement Mixture, U.S. Pat. No. 6,971,819; Inventors Peter L. Zaleski, David J. Derwin, Walter H. Flood Jr. The induction produced and offloaded deceleration energy that is transmitted to the storage site remote from the landing aircraft can either be transmitted to the public utility grid for credit, or more optimally, to energy storage capacitors 13 in the form of recovered and stored electrical energy. The stored energy can then be reconditioned and used for other purposes. The kinetic landing energy conversion to electricity conducted away from the aircraft means that much material mass now required by friction brakes to absorb (sink) and dissipate that energy as waste heat to the atmosphere can be removed from the aircraft. Further, the system also allows the potential for reduction of or removal of other aircraft braking augmentation systems such as thrust reversers and or spoilers.

Offloaded electrical energy is available to be efficiently utilized in other applications, such as airport heating, cooling, runway deicing, other ground operations vehicles and aircraft takeoff power augmentation. The use of recaptured landing energy as takeoff power augmentation is facilitated by the use of the dynamic braking motor/generators as traction motors to augment the main engine(s) takeoff thrust requirement needed for acceleration offering the ability to downsize the main engine(s) thrust rating closer to the cruise requirement, again providing the potential to save both aircraft fuel and weight.

Takeoff power thrust augmentation is supplied in exemplary embodiments in the same manner as is now employed by some high speed train and trolley systems. The induction shoe is employed to provide power from the runway grid to the motor/generator system acting as traction motors at the aircraft wheels. The stored power recovered from the dynamic braking of one aircraft landing is supplied out to another aircraft which is taking off. This is accomplished by using the stored energy recovered from a landing aircraft to supply the energy required to operate the wheel motor/dynamic brakes as traction motors for take off power augmentation to the main engines of another aircraft. As it is not possible to orchestrate the moment of the landing of one aircraft with the exact moment of take off roll of another, the recovered landing energy of the one landing is captured and stored in the storage facility which, for the embodiment shown employs banks of capacitors with high rate energy absorption capability and high energy storage density, which is further enabled with regulatable discharge rates such as are currently available in other applications and are identified by the common trade names of Ultra Capacitors or Super Capacitors, and then supplied at moment of need to another aircraft during its takeoff roll. Since aircraft both takeoff and land on the same runways the same runway induction grid used to recover the landing energy and transmit to the capacitor bank would also function to reverse transmit that energy back to the wheel motor/generators to effect the traction drive mode at takeoff of another aircraft. This same energy redistribution need can enable the use by other ground operations vehicles.

This dual use system is enabled by the fact that aircraft are either taking off from a runway or landing upon a runway but never both concurrently. Therefore the energy is always needed to be conveyed through the runway surface conductive in only one direction at a time.

In addition to being imbedded or applied to the runway, the imbedded energy distribution grid or conductive surface material is also routed onto or into the taxi routes of the taxiways 26 and other operational surface routes in the vicinity of the airport. The taxiways having embedded grids or conductive surface elements on aircraft taxi paths 24 used to and from the gates and runways 16, would function in combination with the transmission grids utilized in the runways for landing energy recovery and takeoff thrust augmentation. By such means this system allows full powered mobility throughout the on-ground mobility profile for an aircraft at the airport. Aircraft can by the methods and means supplied by this system land, taxi to and from the gates and be supplied with take off thrust augmentation by traction motor by using all ground based power except for the case of the takeoff which has power supplied in the form of augmented wheel traction power to the main engines needed thrust requirements at takeoff.

As an additional benefit, for aircraft and airport systems employing the present invention, the APU could be removed from the aircraft eliminating its associated operational costs, weight and its maintenance costs. Once again this provides a multiplying benefit by saving weight, cost and fuel while extending the operational range and economy of the aircraft.

This invention facilitates and retains all normal stopping capabilities of an aircraft, but also adds additional capability in that the offloading of energy would enable an aircraft to meet the aborted takeoff stopping requirement without sacrificing the primary brakes to comply as now normally happens with the current brake system.

The present invention additionally functions as a useful energy supply source to meet other airport energy demands. The energy which is now waste energy that must be sunk and then radiated as heat to the atmosphere from aircraft's onboard braking systems is now by these methods and means usefully recovered and directly converted into electrical energy which can be conditioned and used for other purposes.

FIG. 2 shows the concept for a main gear dynamic regeneration wheel brake motor/dynamic generator in cross section. The operation of the dynamic braking by motor/generator 10 is based on producing a magnetic field resistance between rotor 32 and stator 34. The alternating magnetic fields absorb energy from field resistance which thereby converts kinetic landing brake energy into electrical current.

When used on large aircraft the motor/dynamic generator wheel brakes employ multiple discs working in series within each individual wheel and are of the permanent magnet pancake configuration as are used for the embodiments disclosed herein. This design is very adaptable to facilitate the tailoring of braking power output to individual aircraft applications. Tire 38, rim 39, axle 41, strut 42, jam nuts and washers 43, tire retaining ring 33 and integral motor/generator 10 are shown in FIG. 2 for reference. In alternative embodiments, the wheel motor is adaptable to any number of main gear trucks and wheels as each motor/generator would brake only one wheel.

In another embodiment the motor/brakes can be switched to a non-energized polarity mode when motors of the Segmented Electro Magnetic Array (SEMA) type technology are used or other equivalent capability technologies. This type motor technology does not require use of an overrunning clutch mechanism, which simplifies the system and reduces both system cost and weight. Segmented Magnetic Array technology (SEMA) motor and controller are being developed by Kinetic Art & Technology Corp. and commercialized by Lynx Motion Technology Corp. This capability is accomplished by the SEMA type technology being an ironless technology which utilizes coils in place of iron. Thereby when the coils are not energized there is no magnetic field drag between the magnets and the magnetic iron.

The present invention is employed in alternative embodiments in concert with conventional brake systems for matching overall system requirements. The combination of this technology with a much abbreviated conventional brake capability offers a performance trade at lower speeds by being capable of using the regeneration mode along with reverse polarity activation or by a combination of technologies where the dynamic regeneration is used at higher speeds while the conventional can be used at lower speeds. The benefits of the options provide by this technology will be determined by the systems development to specific applications and by economic and performance trades studies.

As shown in FIG. 2, a conventional brake system 40 is mounted in tandem with the motor generator units 10. A thermal boundary element 31 is located between the dynamic motor/generator and the conventional elements of the braking system. The thermal boundary material is used to thermally protect the dynamic motor/generator from the high temperatures created by the conventional brake if employed in a rejected take off condition.

Figure 3:
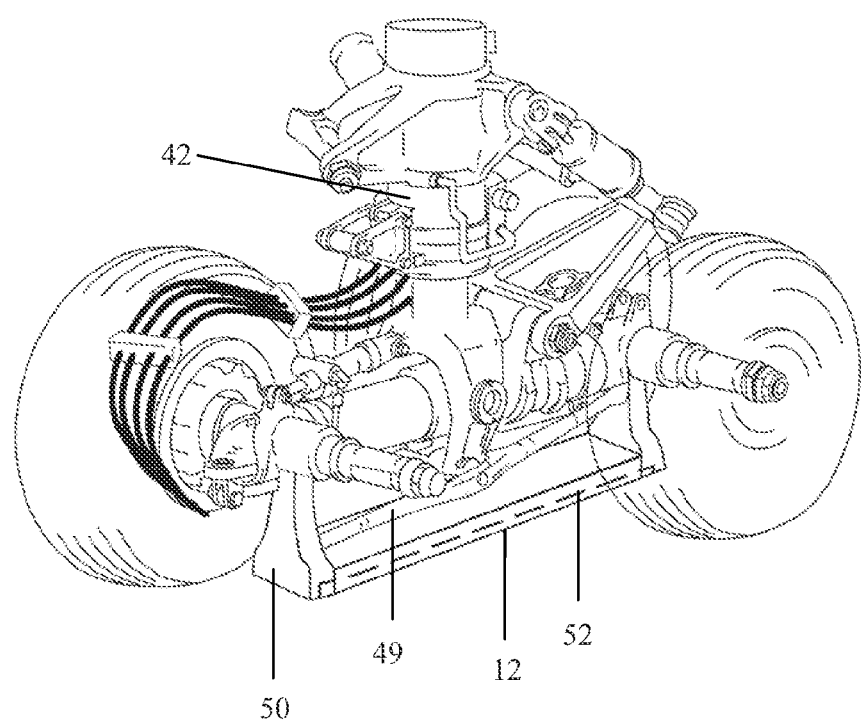
FIG. 3 is a sectional side view of the induction shoe employed to transfer energy to the ground mounted induction grid.

Induction transfer shoe 12 is shown in FIGS. 2 and 3. Attachment arms 50 engage the wheel truck 42, while a drag link arm 49 reacts the drag load of the shoe into the truck and to the strut shaft. The discharge shoes are located between the wheels on each main gear wheel truck set. An induction plate containing induction field coils 52 is positioned to ride a few centimeters over the runway or taxiway surface in which the ground grid is embedded or a conductive surface element is employed. Electrical cabling 54 routes electrical energy to and from the plate and generator/motor system.

The energy being transmitted off-board the aircraft by induction transfer, also creates an additional source of braking power from the effect of that discharge creating ancillary rotating magnetic field represented by elements 53 in FIG. 2 which create induction braking forces between the induction shoe and the collection grid plates imbedded into the runway. Such induction electro-magnetic field form braking is created from the combination of the forward motion and the discharged energy creating magnetic flux field vortices which in turn create a drag force between the discharge shoe and the energy pick up grids or conductive runway surface as is appropriate. This magnetic field formed drag augments the primary braking supplied by high speed dynamic regeneration of the motor/generators braking forces.

The induction generated electro-magnetic resistance field forms a braking assist function as an ancillary benefit and assist to the primary dynamic regeneration braking system and allows further downsizing credit to be taken for the braking system which would further decrease the overall system weight.

The embodiments of the invention disclosed herein employ a multiple disc permanent magnet pancake motor/generator configuration integrated into the main gear wheel hubs and thereby creates a weight efficient, reliable and cost effective design. As previously described, the motor/generator operates in a motor mode for taxi and takeoff power assist. Drive splines 30 and drive coupler 35 shown in FIG. 2 provide traction connection and overspeed disconnection of the motor/generator. The unique attributes of this configuration allows the system to also function in a mode whereby the main gear wheels can be spun up to an RPM which is near landing speed. This pre-landing spin up capability is provided by powering the wheel motor/generators in the same traction motor mode which would be used for taxiing and takeoff thrust assist. Once the wheels are spun up to near landing speed by powering the wheel motor/generators, then power is withdrawn so that the wheel motor/generators are ready to begin operating in the dynamic braking and regeneration mode upon touch down. By having the wheel pre-spun up to near landing speed a significant reduction in tire wear can be achieved which represents a significant cost reduction to the airline.

Further, the system by means of tire rotation pre-spin up minimizes the inertial start up spike loads, which spike load would otherwise be incurred by touch down spin up from a dead stopped wheel motion condition. This condition occurs at initial high speed runway contact of the tires while they are not rotating. Capability for initial spin up of the main gear tires prior to landing will reduce the excess tire wear now experienced at landing touch down. This mode of operation will also reduce the very high inertial loads currently experienced by the structure, which allows a structure credit. The structural credit will allow downsizing the supporting gear structures in material cross sectional requirements as they are currently required to withstand instantaneous high loads experienced by those structures at initial touch down contact.

In certain embodiments, at some sacrifice to this invention's maximal efficiency potential, the regenerated energy would be sunk into and dissipated from the general aircraft structure itself as resistance created heat. These embodiments would provide an interim means of adoption where required to bridge the evolutionary time span required to bring the infrastructure into full adoption and efficiency.

Dynamic motor/generator system 10 functions for both forward braking at landing as a generator, forward drive as a traction motor for taxi and takeoff assist, and also for reverse operation to facilitate reverse drive in the traction motor mode for gate departure. This also includes the function of reverse polarity braking by operating in tandem with the braking energy supplied by the motors dynamic braking capability.

During reverse operations the motor is activated in reverse polarity to drive the wheels in reverse rotation to move the airplane backward. When the slope is negative (downhill) the motor/dynamic and reversal of polarity is used as a brake to limit the reverse speed by alternating between the forward and reverse drive modes.

The motor controller employs a soft start cycle for both the forward and reverse mode operation to reduce the physical starting shock to the motor and aircraft gear when used as drive power. This soft start mode used for braking and drive modes allows the gear truck designs to be sized down by removing material now used to withstand the high spike loads of towing and the hard start wheel spin condition created at landing touch down. This then allows further future weight reductions on new aircraft programs.

Figure 4:
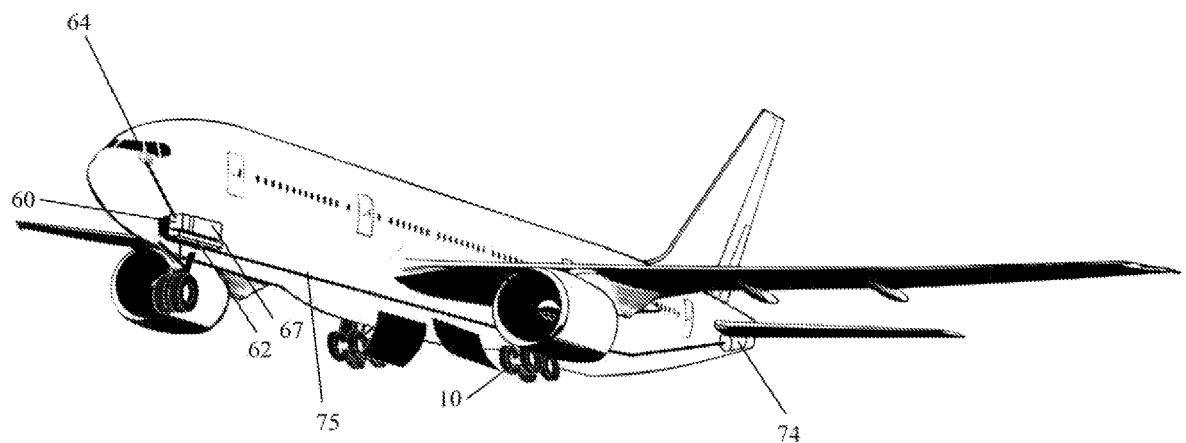
FIG. 4 is a representative pictorial view of an aircraft employing an embodiment of the present invention and the elements of the on-board system.
Figure 5:
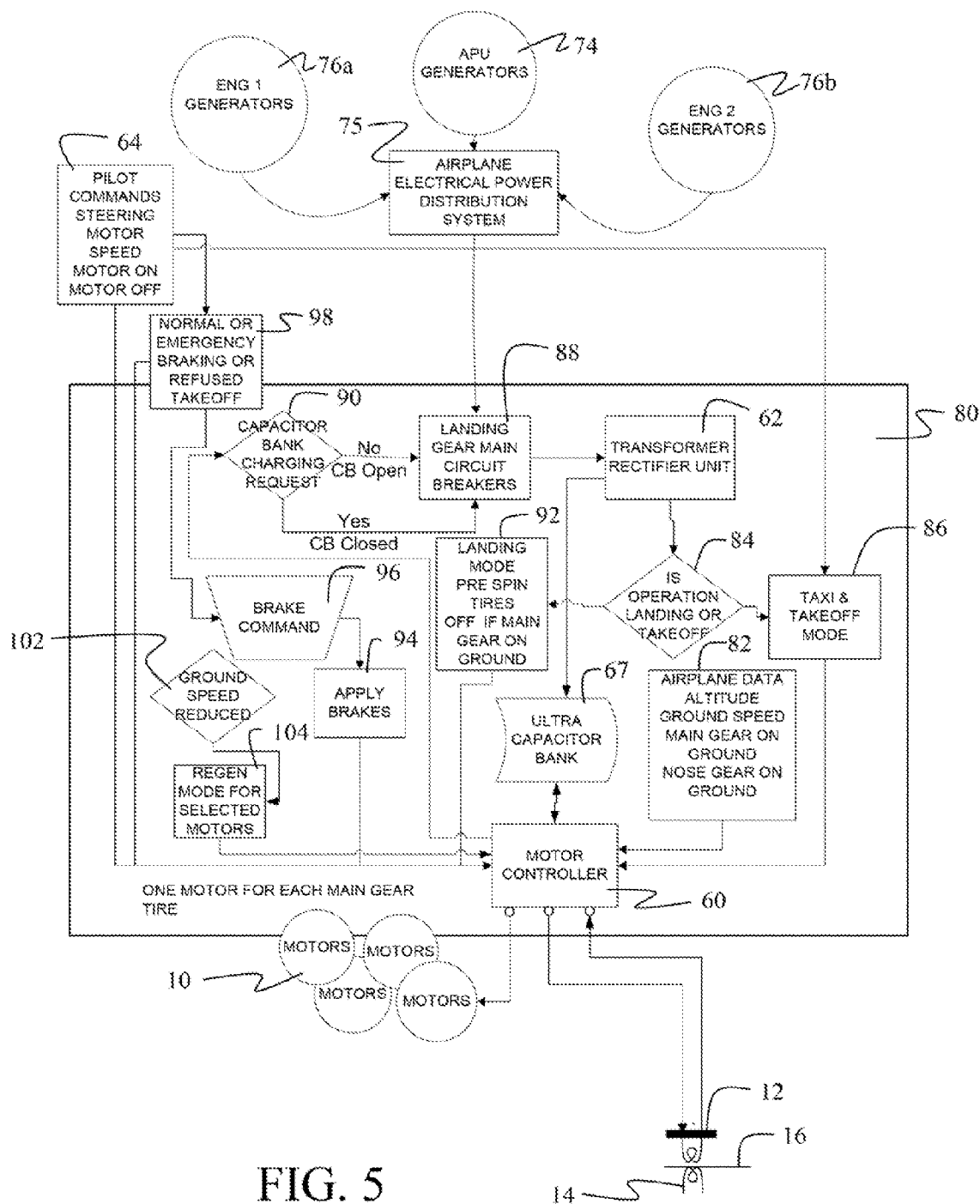
FIG. 5 is a schematic diagram of the electrical components and control system for a braking system employing the present invention.

All motor/generators are sequenced and power balanced with a common interactive controller. As shown in FIGS. 4 and 5, the motor generator units on each wheel truck are controlled by one or more motor controllers 60. Energy from the motor/generators in generator mode is fed through induction shoes 12 to the ground grid or conductive runway surface element as previously described or a portion of that power is directed to the on-board storage capacitor bank 67. This onboard stored energy is then held available for use to augment the high demand required for start of motion breakaway energy demand through the airplane power distribution system. In certain operations where the full system and supporting infrastructure is not in place, aircraft Auxiliary Power Unit (APU) 74 supplies electrical power through airplane electrical power distribution system 75 to through a power converter such as a transformer rectifier unit 62 for transmission to the motor/generator units operating in traction motor mode for taxi or takeoff supplementation where ground conductive paths are not available. For the embodiment shown, power from aircraft engine generators 76a and 76b can also be supplied for system use.

In embodiments where the full system with guidance controls is not in place the pilot has integrated speed and steering control 64 which allows the pilot to regulate the braking distance by controlling the generator functions and to control taxi speeds by controlling the motor functions of the motor/generator system from the cockpit. This system of pilot control is also used as a system safety enhancer by pilot override capability of systems when the fully automated braking and taxi systems become fully adopted.

The components of the system for operation and control of the motor generator systems, generally shown as the ground operations energy management system 80 in FIG. 5 relies on airplane data sensors 82 to provide information for system operation including ground speed, main gear on ground, nose gear on ground and for calculation of wheel spin up, as previously described, aircraft altitude. A determination is made if the desired operation is associated with landing or takeoff/ground operations 84. If in a take-off/ground operations mode 86, input from the pilot in the form of commands from the integrated speed and steering control is provided to the motor controllers which draw power through the induction shoe from the induction grid or conductive surface in the taxiway or runway for actuation of the motor/generators as traction motors.

If the operational mode is landing, landing gear main circuit breakers 88 provide a primary sensor for system operation. With the landing gear sensed as not on the ground 90 wheel spin up control 92 is provided to the motor contollers. In an exemplary embodiment, sensed altitude is then used to cut off wheel spin up power prior to aircraft touchdown. With the landing gear sensed as on the ground, apply brakes control signaling 94 is provided to the motor controllers based on a determination of normal, emergency or refused take-off controls 96. Based on input from the integrated speed and steering control by the pilot, brake commands 98 are provided to modify braking commands to the motor controller to extend the stopping distance for optimum operation.

At the point when evolution of the infrastructure is attained that permits all braking, taxiing and thrust augmentation function to be performed in concert by the aircraft and airport systems, then it is possible to remove the onboard energy storage capacitor bank and the onboard auxiliary power system. Removal of the onboard energy storage capability and the auxiliary power units will again provide significant weight and operational cost reductions to the airlines.

In the exemplary embodiment described, after touch down and a sufficient amount of airplane gravitational weight has been applied to the wheels, as is aided by the spoilers wing lift reduction (which spoiler requirement may be now enabled to be reduced over current requirements) to ensure proper frictional adhesion of tires to the runway surface; the motor/generators are switched on automatically into the dynamic generation mode by means of an actuation mechanism triggered by the compression stroke of the main gear struts, and thereby begin immediately slowing down the aircraft. The pilot's braking control is then available after initial automatic braking has started and thereby is always regulated to supply the optimum stopping distance with pilot override available to lengthen rather than shorten the post landing roll out. This means that the aircraft is by design enabled to stop within the safest and shortest distance practicable and is only overridden to lengthen that distance. This system provides an addition layer of safety over the current system in that if an airplane is landed by autopilot then the braking, steering control and taxi out are fully automated to occur at optimal braking speed without the necessity of input from the cockpit crew.

Antilock braking systems elements are employed on embodiments of the invention to further enhance the braking performance. It is also a system which lends itself easily to the regulation of braking force applied at each wheel which further enhances safety on slick runway conditions.

Once the wheel motor generators are operating in the regeneration mode, the majority of the kinetic energy being converted from the aircraft's weight and velocity into electricity is then discharged as electric current off board the aircraft through the induction shoe. Removing this energy from the aircraft in the form of electricity reduces the mass required to sink (absorb) that energy within the brakes as is now required.

In alternative embodiments, when landing speed is sufficiently reduced 102 in FIG. 5, some of the energy being generated in selected wheel motor/generators is siphoned off those motor/generators and then be used for energizing other motor/generators in a reverse polarization mode 104. This reverse polarization of some regeneration braking units increases the full stopping capability of the system once at lower speed.

Figure 6:
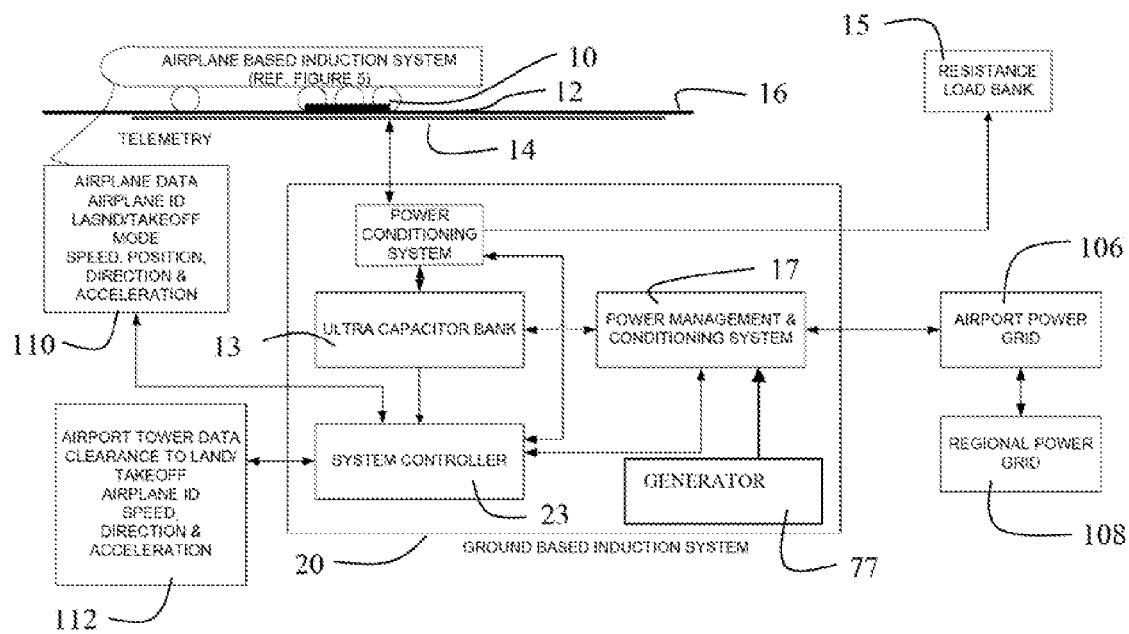
FIG. 6 is a block diagram of the elements of the ground mounted induction system for energy recovery from the induction shoe.

As shown in FIG. 6, the ground based grid or conductive runway surface element 14 located in or on the runway and taxiways provides power to the ground mobility taxi power system as incorporated into the motor/generator wheel system. Controller 23 provides the power received through power conditioning system 105 to the off board storage system ultra capacitors 22 or the heat dissipating resistance load bank 15 as previously described. Power from the storage system(s) is then routed back by controller 23 to supply motor demands of aircraft on the taxiway and during takeoff.

Excess power when available can be used for other needs as reconditioned power distributed to ground system 17 for lighting, heat, ground operations vehicles and other non-aircraft ground functions through the airport power grid 106 or supply to the electric power utility regional power grid 108 whenever total recovered landing energy exceeds taxi and takeoff energy demands and storage capacity is being exceeded.

An excess energy condition occurs when landings are exceeding takeoff and taxi demands. At such times of excess energy being created by landings, then power is reconditioned and fed into the public utility grid or is reconditioned and used to augment other airport energy demands. Conversely; when the taxi and takeoff demands exceed the stored energy from landings then a generator system 77 provides back-up power for use in the taxi/takeoff system requirements. In alternative embodiments, the power conditioning system draws necessary power from the public utility grid.

In extended embodiments, telemetered information from the aircraft such as airplane identification, landing or takeoff mode, speed, position, direction and acceleration 110 as well as airport tower data such as clearance to land/takeoff, airplane identification, speed, direction and acceleration 112 are employed by the system controller in calculating the overall control of the ground based induction system for optimized results.

Currently, the stopping of an aircraft upon landing is accomplished by three primary systems i.e. hydro-mechanical friction brakes, main engine thrust reversing and spoilers. This invention pertains only to a new concept in wheel braking and energy recovery for secondary use, which as a by-product presents the possibility of eliminating the current thrust reversing system and for reducing the wing spoiler systems on new aircraft. Since older aircraft could be partially retrofitted with the primary functional elements of this new system and benefit from weight savings, the application space for this invention is potentially all aircraft in the current and future fleets. On new aircraft the spoilers could be potentially reduced in area to the level required to supply only their airfoil spoiling function as is required to spoil the wing lift and thereby get the aircrafts weight transferred down onto the wheels for the dynamic braking to be effective, while thrust reversing should not be required as its primary purpose of reducing friction brake wear would be eliminated by having a systems which does not experience wear by friction.

The present invention reduces the procurement cost and weight of an aircraft, while raising the end value of an aircraft to create enhanced operating margins for both the aircraft producer and for the aircraft operators. This is accomplished by enabling reduced system weight resultant from reductions in material mass required for heat absorption, lowering sustaining systems costs from reduced system complexity, reducing system non-recurring costs of simplified production and procurement requirements, increasing operational range from the weight reduction, decreased fuel consumption, reducing recurring maintenance costs by eliminating the current brake pad friction wear and resulting periodic replacement of components, and also recovering waste energy and re-deploying it to other needs.

The invention's production cost and weight reductions are achieved from reductions in the braking systems overall complexity and weight. This is achieved by the elimination of most of the brake system mass required for heat absorption and dissipation, and by the potential for the reduction of the spoilers requirement coupled with the possibility for the complete elimination of the thrust reversers, including downsizing or eliminating supporting electrical and hydraulic systems.

The invention's recurring operating cost reductions result from the systems simplification and weight reductions, which will reduce operational fuel consumption and additionally from recurring maintenance cost reductions no longer incurred from friction brake system maintenance and replacement. This is accomplished by this invention's ability to eliminate perishable components now used in friction brake systems, reductions in tire wear resultant from the tires touch down spin up, and from reducing operational fuel consumption from the system weight reduction, which increases an aircrafts operational range and also by providing a facility for what is now waste heat from kinetic landing energy being recovered and utilized for other needs.

The kinetic braking energy from landing is regenerated into the form of electricity and is discharged off board the aircraft by means of induction discharge through an induction discharge shoe to an energy capture, recovery and transmission grid for transmission to a storage location remote from the aircrafts structure, or transmitted to a location remote from the aircraft to be dissipated in the form of resistance created heat that is dissipated to the ambient atmosphere.

The systems ability to capture and reuse kinetic landing energy for aircraft taxiing and take off thrust augmentation provides significant benefits to the environment in the form of reduced air pollution. Currently aircraft use their main engines for thrust to taxi which consumes a large amount of fuel at departure and also requires that the aircraft carry the weight of the taxi in fuel for use at its port of destination taxi in requirements. Therefore it is not just the fuel burned by the current system and the pollution created but also the weight of the taxi in fuel which must be born as an excess fuel ferry cost throughout the full distance of the flight.

The systems disclosed here will also reduce engine operating hours by a large degree. This reduction is provided by not having to run the main engines for taxiing. Reducing engine operating hours reduces engine operating maintenance and increases engine life.

Having now described the invention in detail as required by the patent statutes, those skilled in the art will recognize modifications and substitutions to the specific embodiments disclosed herein. Such modifications are within the scope and intent of the present invention as defined in the following claims. The description has been written to supply enough information to allow those skilled in the referenced arts to create a functional system design and architecture. It is not possible within the framework of a disclosure and description to supply a complete detailed design of such and extensive system but enough description has been provided for those skilled in the described arts to produce a detailed design of the described system.

What is claimed is:

1. A kinetic energy transfer system for an aircraft comprising:
   at least one wheel supporting an aircraft for landing and takeoff;
   a motor/generator mounted to and operated by rotation of the wheel;
   a generator creating electrical energy from aircraft landing deceleration;
   an induction shoe engaged to a wheel truck and having a drag load reaction link for an ancillary rotating magnetic field, said induction shoe electrically connected to the generator and drawing electrical energy from the generator; and,
   a load inductively coupled to the induction shoe and placing a load on the wheel generator for conversion of the rotational energy of the wheel to electrical potential and thereby creating braking drag through the wheel; and,
   an energy storage system acting as the load to store electrical potential energy created by the generator.

2. A kinetic energy transfer system as defined in claim 1 in which the generator is employed as a motor, receiving energy from the storage system for traction power to the aircraft wheel.

3. A kinetic energy transfer system as defined in claim 2 further comprising an induction grid mounted in an operational surface and connected to the energy storage system for supplying energy to the motor through the induction shoe.

4. A kinetic energy transfer system as defined in claim 1 wherein the load includes an induction grid mounted in a runway.

5. A kinetic energy transfer system as defined in claim 4 wherein the resistance of the electrical energy being generated and distributed through the conductive grid provide a deicing capability to the runway.

6. A kinetic energy transfer system as defined in claim 1 wherein the load includes a conductive surface element applied to a runway.

7. A kinetic energy transfer system as defined in claim 1 wherein the energy discharge to the conductive element of the landing surface by the induction shoe in combination with forward aircraft motion creates a resistive magnetic flux field to produce a high motion resistive force between the induction shoe and the conductive surface of the runway surface.

8. A kinetic energy system as defined in claim 1 wherein the energy storage system includes an inverter/converter/power conditioner and energy management unit to draw excess power from the storage system for distribution through buried transmission lines to a primary electrical utility grid for off airport use.

9. An aircraft ground operation system comprising:
   motor/generator mounted with at least one wheel of the aircraft coupled for rotation with the motor/generator;
   an induction shoe engaged to a wheel truck and having a drag load reaction link, said induction shoe interconnected to the motor/generator, the induction shoe extracting electrical energy from the motor/generator in a first operational mode as a generator and providing the extracted energy to an induction grid mounted in a runway, and providing electrical energy from the induction grid to the motor/generator for operation as a traction motor in a second operational mode.

10. An aircraft ground operation system as defined in claim 9 further comprising a pilot override speed control system for controlling energy flow to and from the motor/generator.

11. An aircraft ground operation system as defined in claim 10 wherein the pilot override speed control system controls energy flow to the motor generator for taxi power.

12. An aircraft ground operation system as defined in claim 10 wherein the pilot override speed control system controls energy flow to the motor generator for take-off auxiliary power.

13. An aircraft ground operation system as defined in claim 10 wherein the pilot override speed control system reduces energy flow from the motor generator to extend braking distance.

14. A method for aircraft ground operations comprising the steps of:
   mounting an induction shoe to a wheel truck with a drag load reaction link for an ancillary rotating magnetic field;
   providing a motor/generator rotationally coupled to an aircraft wheel and attached to the induction shoe;
   providing an induction grid or conductive surface element in an operational surface for electrical energy transfer between the induction shoe and an energy storage system;
   operating the wheel motor/generator as a dynamic generator to create a braking load during landing of the aircraft on the operational surface and then transferring the energy from the generator through the induction shoe and the induction grid to the energy storage, conditioning and redistribution system.

15. The method for aircraft ground operations as defined in claim 14 further comprising the steps of:
   providing electrical energy from the energy storage system through the induction grid to the induction shoe;
   operating the motor generator as a traction motor powered by the electrical energy provided through the induction shoe.

16. The method for aircraft ground operations as defined in claim 15 wherein the step of operating the motor generator as a traction motor provides taxiing power for the aircraft.

17. The method for aircraft ground operations as defined in claim 15 wherein the step of operating the motor generator as a traction motor provides take-off power assistance.

18. The method for aircraft ground operations as defined in claim 14 wherein the step of operating the generator to create braking load provides maximum braking capability for shortest stopping distance of the aircraft and further comprising the step of providing a pilot operated control for reducing the generator load to extend the stopping distance of the aircraft when required.

19. The method for aircraft ground operations as defined in claim 14 including the step of providing a conventional braking system capable of augmenting the dynamic braking functions when an aircraft is required to perform a rejected take off while at maximum gross weight.

20. The method for aircraft ground operations as defined in claim 14 wherein magnetic eddies associated with energy transfer from the induction shoe to the ground grid or conductive runway surface element provides further braking drag for the aircraft.

21. The method for aircraft ground operations as defined in claim 14 further comprising the step of distributing electrical power from the storage system for non-aircraft ground functions.

22. The method for aircraft ground operations as defined in claim 14 further comprising the step of allowing automated central control of ground mobility of aircraft within the airport operations profile from taxi out from loading/boarding gates to runway for take off and then on through landing at destination and taxi return to the unloading debarkation gate.

\* \* \* \* \*